United States Patent
Mirchandani et al.

(10) Patent No.: US 8,630,915 B1
(45) Date of Patent: Jan. 14, 2014

(54) SYSTEM, METHOD, AND COMPUTER READABLE MEDIUM FOR ITEM FEED CLASSIFICATION

(75) Inventors: Jeetendra Mirchandani, Bellevue, WA (US); Matias H. Ganc, Seattle, WA (US); Mohit Gupta, Bellevue, WA (US); Simon C. Vining, Renton, WA (US)

(73) Assignee: Amazon Technologies, Inc, Reno, NV (US)

( * ) Notice: Subject to any disclaimer, the term of this patent is extended or adjusted under 35 U.S.C. 154(b) by 0 days.

(21) Appl. No.: 13/563,034

(22) Filed: Jul. 31, 2012

Related U.S. Application Data

(62) Division of application No. 12/627,583, filed on Nov. 30, 2009, now Pat. No. 8,266,003.

(51) Int. Cl.
*G06Q 30/00* (2012.01)
*G06F 17/30* (2006.01)

(52) U.S. Cl.
USPC .......................... 705/26.1; 707/736; 707/802

(58) Field of Classification Search
USPC ........ 705/26.1–27.2; 707/609, 705, 709, 736, 707/758, 790, 802–804
See application file for complete search history.

(56) References Cited

U.S. PATENT DOCUMENTS

| | | | |
|---|---|---|---|
| 7,870,039 B1 | 1/2011 | Dom et al. | |
| 8,266,003 B1 * | 9/2012 | Mirchandani et al. | 705/26.1 |
| 2005/0108193 A1 | 5/2005 | Schauerte et al. | |
| 2005/0114273 A1 | 5/2005 | Ettinger, Jr. | |
| 2005/0203804 A1 | 9/2005 | Suzuki et al. | |
| 2008/0167974 A1 * | 7/2008 | Lee et al. | 705/27 |
| 2011/0137908 A1 | 6/2011 | Dom et al. | |

OTHER PUBLICATIONS

Using TF-IDF to Determine Word Relevance in Document Queries. Juan Ramos. Department of Computer Science, Rutgers University.*
Term frequency/Inverse document frequency implementation in C#. Thanh Dao. Oct. 28, 2005.*
"Dynamo Marketing backs Web loyalty points scheme". Marketing Week. Mar. 18, 1999.

* cited by examiner

*Primary Examiner* — William Allen
(74) *Attorney, Agent, or Firm* — Thomas|Horstemeyer, LLP.

(57) ABSTRACT

This document relates to classification of items included in a data feed. For example, a feed of items is generated for provision to a referral network site. The feed includes some of the items sold through an electronic commerce network site. Item classification information corresponding to an item sold through the electronic commerce network site is identified based upon the taxonomy information of the referral network site and included in the generated feed of items.

20 Claims, 5 Drawing Sheets

SYSTEM, METHOD, AND COMPUTER READABLE MEDIUM FOR ITEM FEED CLASSIFICATION

CROSS REFERENCE TO RELATED APPLICATION

This application is a divisional application of and claims priority to co-pending U.S. patent application entitled "Data Feed Item Classification" filed on Nov. 30, 2009 and assigned application Ser. No. 12/627,583, which is incorporated herein by reference in its entirety.

BACKGROUND

For merchants that sell products on the Internet, it can be useful to have other network sites help drive traffic to the network site of the merchant in order to increase sales. Such other network sites may be paid a referral fee or other fee by the merchant for each customer that is directed to the network site of the merchant. Such other network sites may comprise comparison shopping sites that compare the prices of multiple merchants for various items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
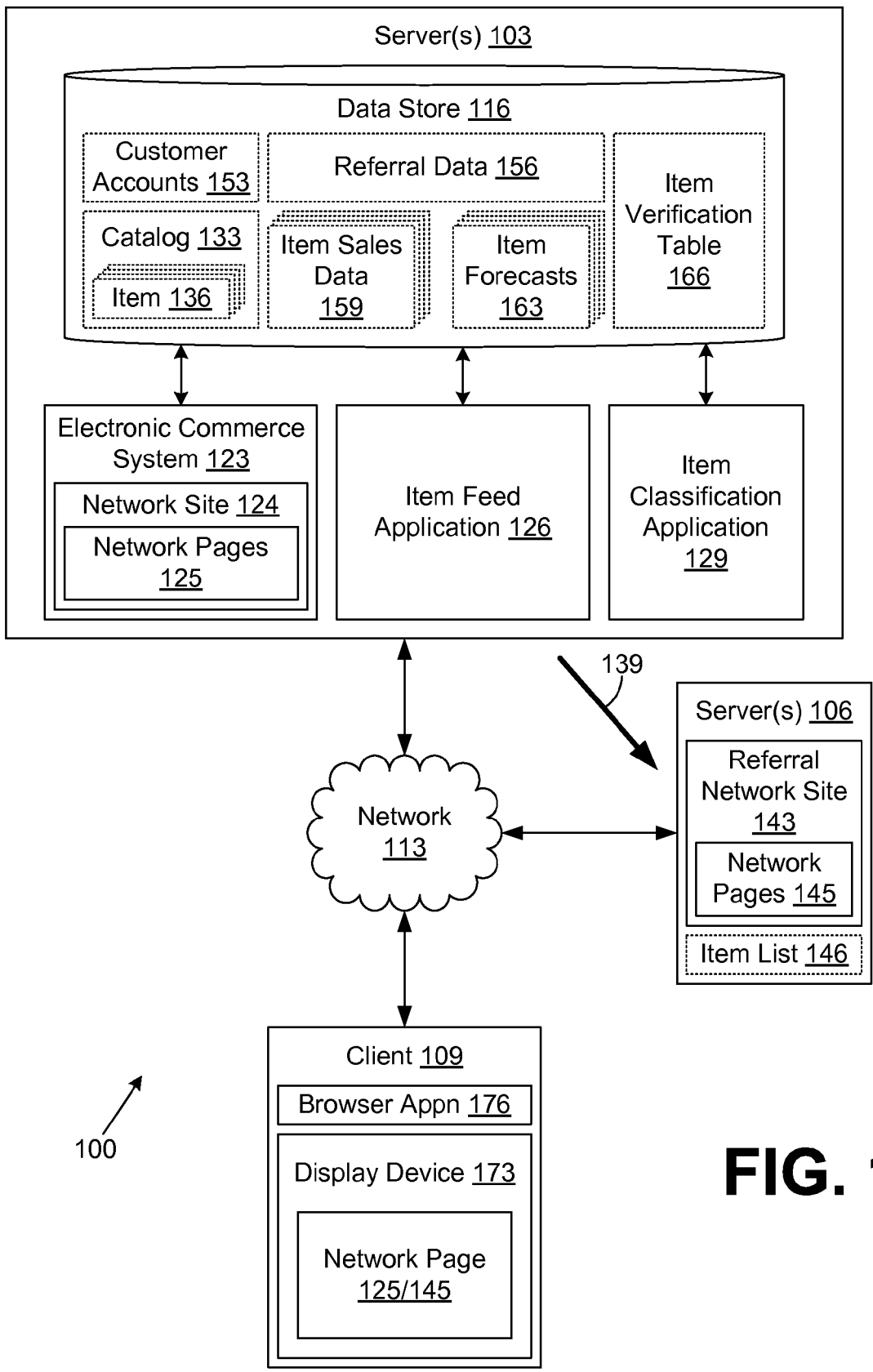
FIG. 1 is a drawing of a networked environment that includes servers and a client according to an embodiment of the present disclosure.

With reference to FIG. 1, the following relates to the transmission of data to a network site 124 such as a comparison shopping site in a networked environment 100 in association with the activities of a merchant that sells goods and/or services online over a network 113 such as the Internet or other network. In the following discussion, first a description of the physical nature of the networked environment 100 is provided, followed by a description of the operation of the same. A more detailed discussion of various aspects is provided with respect to later figures.

The networked environment 100 depicted in FIG. 1 includes various computing devices such as, for example, one or more servers 103, one or more servers 106, one or more clients 109, and/or other computing devices that are coupled to a network 113. The network 113 may comprise, for example, the Internet, intranets, extranets, wide area networks (WANs), local area networks (LANs), wired networks, wireless networks, or other suitable networks, etc., or any combination of two or more such networks. For purposes of convenience, each of the servers 103, 106 and the client 109 are referred to herein in the singular. However, it is understood that in one embodiment, each of the servers 103, 106 may represent a plurality of servers. Also, the client 109 may represent a plurality of clients.

Each of the servers 103 and/or 106 comprises one example of a computing device that may be employed to execute various components as described herein. Each of the servers 103 and/or 106 may comprise, for example, a server computer or like system, and may represent multiple servers arranged, for example, in one or more server banks or other arrangements. Such servers 103 and/or 106 may be located in a single installation or may be dispersed among many different geographical locations. To this end, each of the servers 103 and/or 106 may be viewed as a server "cloud" that represents the computing capacity of multiple servers, etc.

Various applications and/or engines are executed in the server 103 according to various embodiments. Also, various data may be stored in a data store 116 that is accessible to the server 103. The data stored in the data store 116, for example, may be associated with the operation of the various systems, applications, and/or processes described below. The systems and applications executed in the server 103 may include, for example, an electronic commerce system 123, an item feed application 126, an item classification application 129, and potentially other systems and applications. Among other functions, the electronic commerce system 123 includes a network site 124 as will be described. In addition, other systems, applications, and/or processes may be implemented in the server 103 that are not discussed in detail herein.

The electronic commerce system 123 is configured to conduct electronic commerce to facilitate the network presence of one or more online merchants through the network site 124. Thus, the electronic commerce system 123 operates one or more network sites 124 such as web sites on the Internet that facilitate electronic commerce. The electronic commerce system 123 may comprise many different applications, components, and/or systems implemented on a plurality of computing devices such as the server 103 that are located at one site, or are distributed among geographically diverse sites as can be appreciated.

The applications and/or components that make up the electronic commerce system 123 provide for various functions to facilitate electronic commerce such as maintaining and accessing a catalog 133 in which is stored data describing a plurality of items 136 such as products sold to customers by an online merchant. The data describing each of the items 136 may include item images and other information. The items 136 sold through the electronic commerce system 123 may comprise, for example, goods and/or services.

The electronic commerce system 123 may also facilitate various functions associated with the operation of the network site 124 such as, for example, generating network pages 125 that provide for searching for items 136 and presenting search results for such items 136. Such network pages 125 may also present detailed information about items 136 and may facilitate the purchase of items 136 by providing for payment for items 136 and facilitating other functions. Thus, in providing for the purchase of items 136, the electronic commerce system 123 implements one or more network sites 124 that generate a plurality of different network pages 125 such as web pages or other network content that is served up to various clients 109 controlled by customers. Such network pages 125 may be static and/or created dynamically.

The item feed application 126 is executed in the server 103 in order to generate a feed 139 that comprises a listing of the items 136 that is sent to a referral network site 143 implemented on the server 106. The referral network site 143 functions to refer clients 109 to the network site 124 and other sites as will be described. The referral network site 143 generates and serves up network pages 145 to clients 109 as will be described.

The information included in the feed 139 is stored in association with the operation of the referral network site 143 as item list 146. The item classification application 129 is executed in the server 103 in order to provide classification recommendations for items 136 included in a feed 139 sent to a referral network site 143 in accordance with the taxonomy of the site. In some embodiments, the item classification application 129 may be included in the item feed application 126.

In addition, various customer accounts 153 may be maintained in the data store 116. Such customer accounts 153 may include customer data that describes the customer including payment addresses, delivery addresses, payment instruments, and other data used to consummate various commercial transactions. Also associated with each of the customer accounts 153 are browse histories, purchase histories, and potentially other data.

Also stored in the data store 116 are referral data 156, item sales data 159, item forecast data 163, an item verification table 166, and potentially other data. The referral data 156 includes data that tracks when a client 109 has requested a network page 125 from the network site 124 based upon a referral from the referral network site 143 as will be described. The item sales data 159 tracks the number of each of the items 136 that are sold over time through the electronic commerce system 123 as well as other information about the sales of items 136. The item forecast data 163 includes sales forecasts generated for each of the items 136 that are generated based on various factors such as past sales performance and other factors. The item verification table 166 is used to track whether items 136 included in the feed 139 appear on respective network pages 145 generated by the referral network site 143 as expected. The various data stored in the data store 116 may be stored or accessed by the electronic commerce system 123, the item feed application 126, the item classification application 129, or other applications and systems as can be appreciated.

As mentioned above, the server 106 is employed to implement the referral network site 143. In one embodiment, the referral network site 143 provides for comparison shopping and is configured to generate and serve up network pages 145 that include listings of multiple offerings for various items 136 from multiple different merchants as will be described. The item list 146 includes information about each of the items 136 included in the feed 139 sent to the referral network site 143. Such information may include all or a portion of the information contained about such items 136 in the catalog 133.

The client 109 is representative of a plurality of client devices that may be coupled to the network 113. For example, the client 109 may comprise one of millions of clients 109 coupled to the Internet. The client 109 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 109 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display device 173, indicator lights, speakers, etc. The display device 173 may comprise, for example, cathode ray tubes (CRTs), liquid crystal display (LCD) screens, gas plasma-based flat panel displays, LCD projectors, or other types of display devices, etc.

Executed within the client 109 are various applications including a browser application 176. The client browser application 176 is configured to interact with the electronic commerce system 123 and potentially other applications on the server 103 according to an appropriate protocol such as the Internet Protocol Suite comprising Transmission Control Protocol/Internet Protocol (TCP/IP) or other protocols. To this end, the browser application 176 may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Alternatively, the browser application 176 may comprise some other type of interface application with like capability. When executed in the client 109, the browser application 176 is configured to render network pages 125/145 such as, for example, web pages and the like on the display device 173 and to perform other functions. Also, the browser application 176 may implement the execution of active portions of the network pages 125/145 as can be appreciated.

Next, a general description of the operation of the various components described above in the networked environment 100 is provided. The electronic commerce system 123 is configured to conduct electronic commerce with various customers through clients 109 over the network 113 as described above. To this end, the electronic commerce system 123 implements a network site 124 through which items 136 are sold to customers as can be appreciated. Such items 136 are stored in the catalog 133 as described above. In conducting electronic commerce with various clients 109, the electronic commerce system 123 may serve up various network pages 125 that serve various purposes as mentioned above.

The sales of items 136 through the electronic commerce system 123 may occur through any one of multiple channels. One such channel involves sales that originate through a referral from a respective referral network site 143. Another channel involves direct sales consummated by the electronic commerce system 123 without a referral. In addition, sales of items 136 may involve other channels. Thus, a channel as contemplated herein refers to a mode in which the sale of an item 136 was originated or consummated.

As mentioned above, in one embodiment, the referral network site 143 implemented on the server 106 refers customers to the network site 124 associated with the electronic commerce system 123 to potentially consummate a purchase of an item 136.

Figure 2:
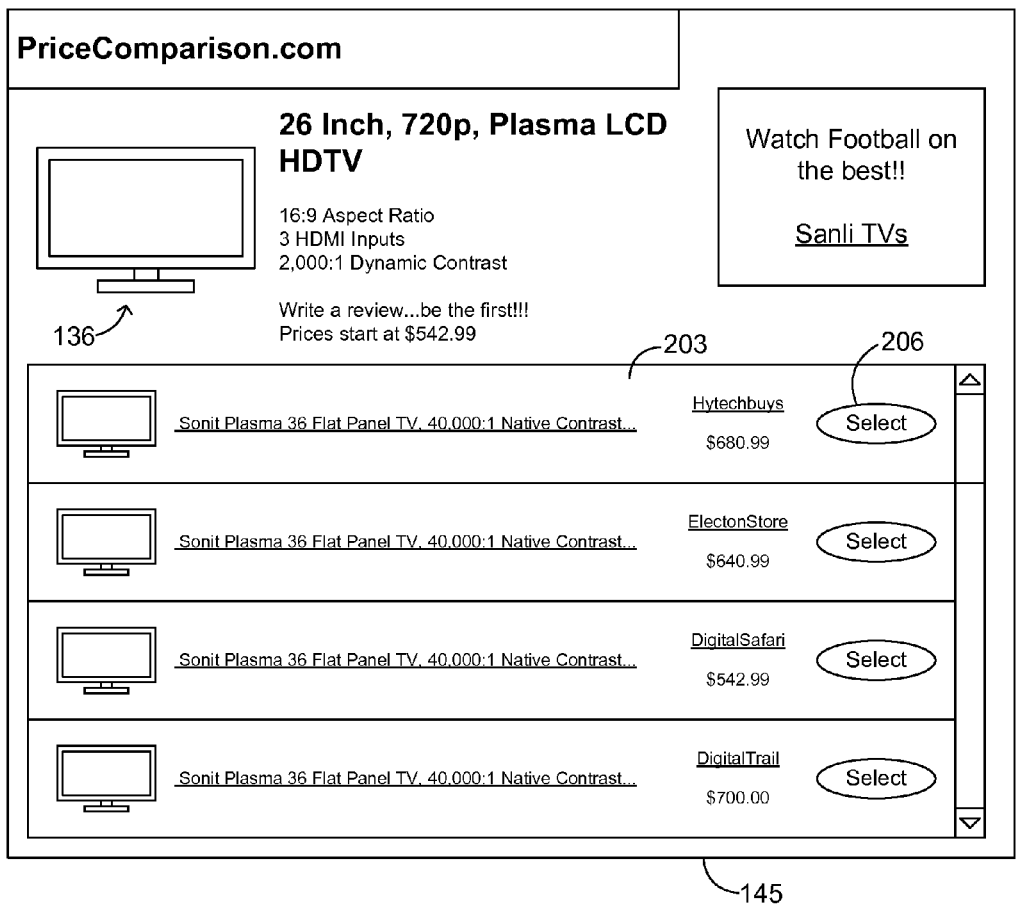
FIG. 2 is a drawing of a network page generated by a network site hosted on one of the servers in the networked environment of FIG. 1 according to an embodiment of the present disclosure.

To explain further, reference is made to FIG. 2, in which one example is shown of a network page 145 generated by the referral network site 143 (FIG. 1). The network page 145 is one example of many different network pages 145 generated by the referral network site 143, where the referral network site 143 provides for price comparison shopping. Examples of such price comparison sites include www.shopzilla.com, www.shopping.com, and other such sites. To this end, the network page 145 displays an item 136 along with a basic description of the item 136. A more detailed description of the item 136 may also be displayed, or links, tabs, or other connections to a more detailed explanation may be included, etc. In addition, the network page 145 displays a number of merchant offerings 203 for the respective item 136. To this end, a user is able to specify a given item 136 that they wish to purchase on the referral network site 143 by performing a product search or by navigating through the taxonomy as can be appreciated. The user may then cause the referral network site 143 to generate the network page 145 that sets forth the merchant offerings 203 for the respective item 136. The user can then compare the various merchant offerings 203 for the item 136 and select the offer they favor the most. Associated with each merchant offering 203 is a link 206 that directs the customer to a respective site of a corresponding merchant. One of the links 206 directs the customer to the network site 124 (FIG. 1) of the merchant that operates the electronic commerce system 123 (FIG. 1) described above. Each of the links 206 may be embodied in the form of a "select" button or other component as can be appreciated. If a user wishes to pursue a purchase of the item 136 based on a respective merchant offering 203, then the user may click on the respective button or other component associated with such merchant offering 203 to be referred to the merchant site.

Referring back to FIG. 1, upon manipulating the link 206, the user is referred to a network page 125 (FIG. 1) generated by the network site 124 that comprises, for example, a detail page presenting the item 136 with the ability to place such item into a shopping cart and proceed to checkout in order to purchase such item 136 or take other action. In order to cause the network site 124 to generate the respective network page 125 that comprises a detail page presenting the respective item 136 viewed in the network page 145, the link 206 causes a browser application 176 (FIG. 1) to generate a request for the specific network page 125 that comprises the detail page presenting the item 136 as can be appreciated.

Such a request includes information indicating that the request is based upon a referral from the respective referral network site 143. The electronic commerce system 123 is configured to store all of the referrals received from referral network sites 143 for each of the items 136 in the referral data 156 (FIG. 1). Thus, over time, the electronic commerce system 123 will store all of the referrals received from referral network sites 143 in the data store 116 (FIG. 1) for future reference in determining whether items 136 are to be included in the feed 139 (FIG. 1) as will be described.

In some situations, there may be a commercial relationship established between the operator of a referral network site 143 and a merchant who operates the electronic commerce system 123. For example, the merchant operating the electronic commerce system 123 may pay the operator of a referral network site 143 a predefined fee for each referral received. Alternatively, the merchant and the operator of the referral network site 143 may agree that the merchant is to pay the operator a predefined percentage of the sales price for all items 136 sold based upon a referral received from the referral network site 143.

In this respect, the parties may generate mutually beneficial relationships such that the merchant receives the benefit of extra traffic driven to the network site 124, and the operator of the referral network site 143 receives the benefit of having more items 136 to list and more merchant offerings 203 (FIG. 2) to show in various comparisons for various items 136 as described above. In addition, there may be other terms specified between the parties for the referral activity.

A number of referrals may be tracked in both the server 103 by the respective merchant and in the server 106 by the respective operator of the referral network site 143 so that precise amounts owed based upon referrals as described above can be determined. Similarly, the number of sales based upon a referral may be maintained in the server 103 in the item sales data 159 (FIG. 1) so that appropriate amounts may be calculated to pay to the operator of the referral network site 143 as can be appreciated.

In order to provide the operator of the referral network site 143 with the information needed to present the merchant offering 203 with respect to items 136, the item feed application 126 is executed in the server 103 in order to generate the feed 139 that includes a subset of the total number of items 136 stored in the catalog 133. The feed 139 includes a listing of a subset of all of the items 136 contained in the catalog 133 that have been selected or otherwise designated to send to the referral network site 143. The information contained in the feed 139 for each of the items 136 included therein may comprise selected details about such items 136 including item images, product descriptions, product feedback ratings, and other information as can be appreciated.

The feed 139 may be sent from the item feed application 126 to the referral network site 143 periodically in such a manner so as to maintain the most up-to-date item list 146 in the referral network site 143. For example, the feed 139 may be sent weekly, daily, every few hours, or at any other appropriate time interval as can be appreciated. In one embodiment, the feed 139 may include a description of all items 136 included therein in a complete listing. In other embodiments, the feed 139 may only include such information that has changed relative to a prior feed 139 sent previously. For example, such information may include any changed prices, or other aspects of the items 136 that have been sent to the referral network site 143 in a prior feed 139.

When a feed 139 is received by the referral network site 143, the items 136 are classified within the taxonomy of the referral network site 143. However, misclassification of some items 136 may cause the items to be listed in the wrong category or not listed at all. As a result, a classification mismatch can produce a drop in product visibility and coverage.

The item feed application 126 may also include item classification information for items 136 within the feed 139. The item classification information includes one or more recommended class (or category) for an item 136 within the taxonomy of the referral network site 143. Additionally, the item classification information may include a confidence level corresponding to a recommended class, which indicates the strength of the recommendation. In this way, it is possible to improve product visibility and coverage by providing classification recommendations for consideration and adoption by the referral network site 143.

Figure 3:
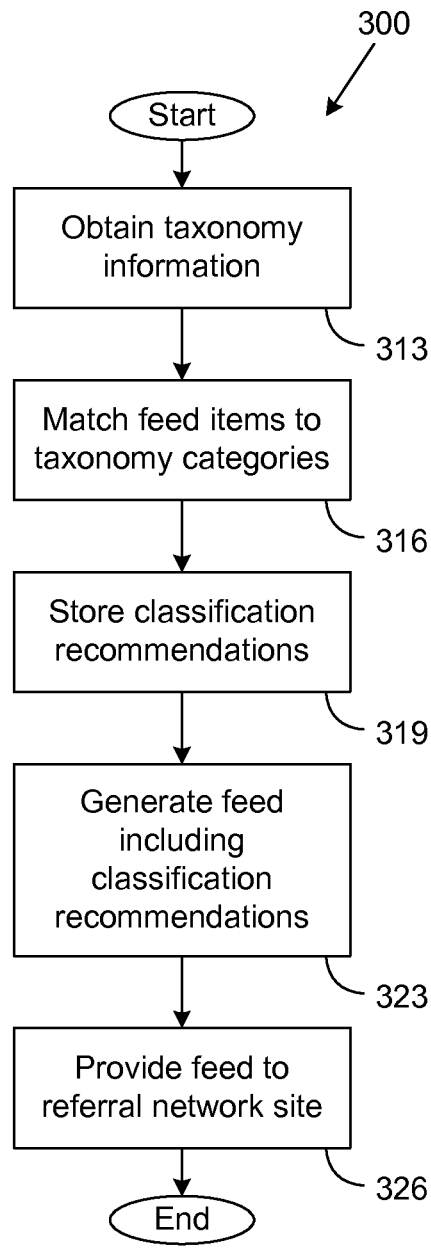
FIG. 3 is a drawing of a flowchart that illustrates example functionality of a classification process implemented in one of the servers in the networked environment of FIG. 1 according to an embodiment of the present disclosure.

The item classification application 129 is executed to provide classification recommendations for items 136 included in a feed 139 sent to a referral network site 143 in accordance with the taxonomy of the site. With reference to FIG. 3, shown is a flowchart that illustrates one example of a classification process 300 of the item classification application 129 that is executed to identify classifications within the taxonomy of the referral network site 143 for items 136 within a feed 139 provided to the referral network site 143 as described above. Alternatively, the flowchart of FIG. 3 may be viewed as depicting steps of a method implemented within the item feed application 126 (FIG. 1) according to various embodiments.

To begin, the classification process 300 obtains taxonomy information associated with the referral network site 143 in box 313. Taxonomy information can include taxonomies, categories, and samples of items 136 within each category. In one embodiment, the taxonomy information is provided by the referral network site 143 (FIG. 1) and maintained in the data store 116 (FIG. 1). Taxonomy information may be provided and/or updated by the referral network site 143 at predetermined intervals, scheduled times, or as changes to the taxonomy are implemented. In other embodiments, the taxonomy information is stored by the referral network site 143 on server 106. Taxonomy information may be retrieved by the item classification application 129 from the referral network site 143.

Items 136 included in the feed 139 may then be classified in box 316. Classification may be preformed for all or a portion of the items 136 in a catalog 133. Items 136 are matched to categories of the taxonomy of the referral network site 143 in box 316 and the classification recommendations are then stored (e.g., in data store 116) for use by the item feed application 126 in box 319. Items 136 may be matched with one or more categories within the taxonomy of the site. The classification recommendations (or item classification information) may then be utilized by the item feed application 126 in the generation a feed 139 (in box 323) such that one or more classification recommendations are included for items 136 in the feed 139. The generated feed 139 including classification recommendations for the feed items 136 may then be provided to the referral network site 143 (in box 326).

Figure 4:
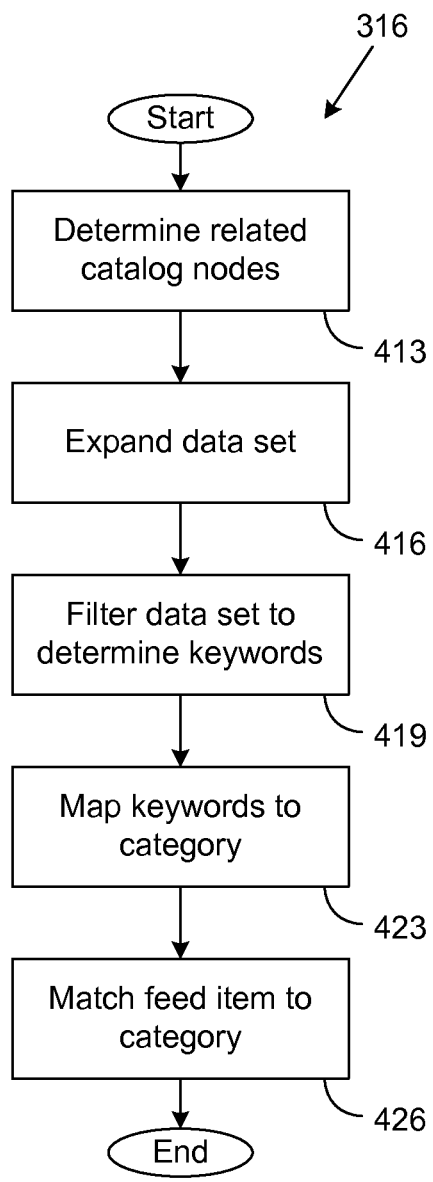
FIG. 4 is a drawing of a flowchart that illustrates additional functionality of an exemplary classification matching implemented during the classification process of FIG. 3 according to an embodiment of the present disclosure.

Referring next to FIG. 4, shown is a flowchart that illustrates an exemplary embodiment of the classification matching carried out in box 316 of FIG. 3. To begin, in box 413, a browse assignment service is utilized to determine related nodes within catalog 133 and the taxonomy of the referral network site 143. Given a title and/or category of the referral network site 143, the browse assignment service provides related browse paths within catalog 133. The browse assignment service uses an index of browse paths and their corresponding keywords to provide the related path(s). Based upon the words included in the title and/or category of the referral network site 143, the browse assignment service determines one or more catalog path(s) based upon the index keywords. For example, given a referral network site category of:
  Electronics>Home Audio>Amplifiers,
the browse assignment service may return catalog paths of:
  Electronics/Audio & Video/Receivers & Amplifiers/Component Receivers/Home Theater Receivers;
  Electronics/Audio & Video/Receivers & Amplifiers/Component Receivers;
  Electronics/Audio & Video/Receivers & Amplifiers/Component Receivers/Stereo Receivers; and
  Electronics/Audio & Video/Receivers & Amplifiers/Component Preamplifiers
This is repeated for other categories of the referral network site 143.

The data set for each category is then expanded in box 416. Similar or related items 136 (FIG. 1) in the catalog paths are identified based upon samples of items 136 provided by the referral network site 143 for the site category, and added to the data set. The title, description, browse path, and other related information for the items in the data set define a universe of terms that can be utilized for classifying related items 136. In some embodiments, the data set may not be expanded when a high level of confidence exists for the correlated catalog path(s). Confidence levels may be determined using a Jaccard Index or other appropriate confidence evaluation process.

The universe of terms is filtered in box 419 by removing commonly occurring words (such as "a", "the", etc.) and determining keywords that may be utilized for classification. Determination of keywords may be accomplished using term frequency-inverse document frequency (TFIDF) or other appropriate information text indexing or classification application. The mapping of the keywords to each category of the referral network site 143 is stored (e.g., in data store 116) in box 423.

In box 426, feed items 136 are then matched to one or more categories of the referral network site 143 based upon the keyword mappings. In one embodiment, the matching is accomplished using TFIDF, which considers words in the title, description, browse path, and/or other related information for the item 136 and measures their similarity to the keywords of the category mappings. Other matching utilities may be used to determine the category matching. For example, keywords may be determined for each item based upon its related information and a support vector machine (SVM) may then be used to match the item to a category. In some embodiments, bigram analysis of pairs of keywords may be utilized in the matching process.

In other embodiments, some words in the item information may be weighted to provide an improvement in matching. For example, words in the title or browse path may be considered more descriptive of the item and thus may be given a higher weighting that those in the description or a customer review. In one embodiment, the weighting is obtained based upon the training samples. After the keywords are determined in box 419, the source or location of the keywords in the item information is determined. Based upon the frequency and/or commonality of keywords in certain locations, words in the identified locations may be given a higher weighting. For example, if keywords are more frequently located within the title, then the title is given a higher weighting than other item information.

A confidence level may also be determined for each category that is matched with an item. In one embodiment, the confidence level is provided by TFIDF or other appropriate confidence evaluation process. The confidence level may be used to determine which category match or matches to recommend to the referral network site 143. For example, the match with the highest confidence level is selected if only a single category recommendation is provided for each item. If multiple category recommendations may be provided for an item, then the category recommendations and the corresponding normalized confidence levels may be sent for evaluation by the referral network site 143. In one embodiment, a normalized confidence level of greater than 0.6 indicates a very good match while a normalized confidence level below 0.2 indicates a bad match. Normalized confidence levels between 0.2 and 0.6 may not provide a good indication of the strength of the match.

Referring back to FIG. 3, one or more category match can be stored (e.g., in data store 116) as classification recommendation(s) for a feed item 136 (in box 319). Corresponding confidence levels may also be stored as part of the classification recommendation. In some embodiments, the confidence levels may be adjusted by tracking the performance of a recommended category. By comparing the performance of a portion of the category to the performance of the remaining part, feedback may be provided for tuning the confidence level.

The classification recommendations may then be utilized by the item feed application 126 (FIG. 1) in the generation a feed 139 (in box 323) such that one or more classification recommendation is included for items 136 in the feed 139. The generated feed 139 including classification recommendations for the feed items 136 may then be provided to the referral network site 143 (in box 326). In some embodiments, a classification recommendation for a single category (e.g., with the highest confidence level) is provided in the feed 139. In other embodiments, multiple categories may be included in the feed 139 as the classification recommendation for an item. Normalized confidence levels may also be included to allow the referral network site 143 to evaluate the strength of each recommendation.

Figure 5:
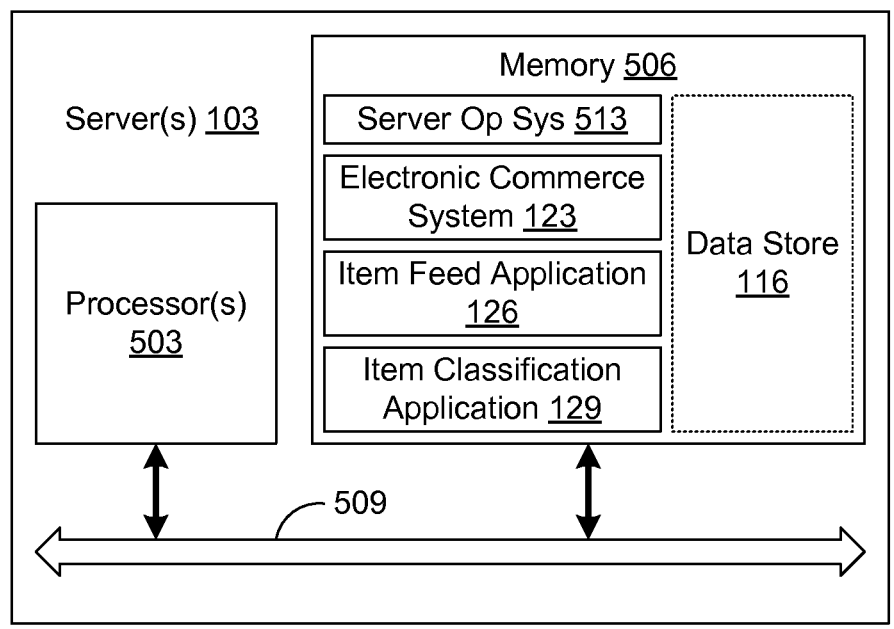
FIG. 5 is a schematic block diagram of one example of one of the servers in the networked environment of FIG. 1 according to an embodiment of the present disclosure.

Referring next to FIG. 5, shown is a schematic block diagram of one example of a server 103 according to an embodiment of the present disclosure. The server 103 includes at least one processor circuit, for example, having a processor 503 and a memory 506, both of which are coupled to a local interface 509. The processor 503 is a solid state device that includes millions of switching elements such as transistors and other elements. The server 103 may comprise, for example, a server computer system or like device as described above. The local interface 509 may comprise, for example, a data bus with an accompanying address/control bus or other bus structure as can be appreciated.

Stored in the memory 506 are both executable applications and/or systems executed by the processor 503 and data. In particular, stored in the memory 506 and executable by the processor 503 are a server operating system 513, the electronic commerce system 123, the item feed application 126, the item classification application 129, and potentially other applications and/or systems, etc. Also, stored in the memory 506 is the data store 116 in which are stored the various data items 136 (FIG. 1) described above so as to be accessible to the processor 503. It is understood that other data may be stored in the memory 506 and accessed by the processors 503 beyond the data described above.

A number of software components are stored in the memory 506 and are executable or executed by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 503 may represent multiple processors and the memory 506 may represent multiple memories that operate in parallel. In such a case, the local interface 509 may be an appropriate network 113 that facilitates communication between any two of the multiple processors 503, between any processor 503 and any one of the memories 506, or between any two of the memories 506, etc. The local interface 509 may comprise additional systems designed to coordinate this communication, including, for example, performing load balancing. The processor 503 may be of electrical or of some other available construction.

The various systems, applications, or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as, for example, the electronic commerce system 123, the item feed application 126, and the item classification application 129 described above may be embodied in software or code executed by general purpose hardware, as an alternative each may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-4 show the functionality and operation of an implementation of the various applications and/or other components such as, for example, the classification matching as a portion of the item classification application 129 as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4 show a specific order of execution, it is understood that the order of execution may differ from that which is depicted. For example, the order of execution of two or more blocks may be scrambled relative to the order shown. Also, two or more blocks shown in succession in FIGS. 3-4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications, systems, and/or other components described herein such as, for example, the electronic commerce system 123, the item feed application 126, and the item classification application 129 comprise software or code, each can be embodied in any computer-readable medium for use by or in connection with an instruction execution system such as, for example, a processor 503 in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, semiconductor, or other media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer readable medium embodying a program executable by at least one computing device, comprising:
  an item feed application configured to periodically generate an item feed of a subset of a plurality of items for provision to a comparison shopping network site over a network, the items being offered to a plurality of customers through an electronic commerce network site, the item feed including a classification recommendation associated with individual ones of the subset of the plurality of items; and
  an item classification application comprising:
    code that obtains taxonomy information associated with a plurality of categories of the comparison shopping network site;
    code that determines related catalog nodes of the electronic commerce network site based at least in part upon one of the plurality of categories of the comparison shopping network site;
    code that expands the taxonomy information based at least in part upon at least one item included in the related catalog nodes;
    code that determines keywords corresponding to individual ones of the plurality of categories based at least in part upon the taxonomy information;
    code that matches at least one of the subset of the plurality of items to at least one of the plurality of categories based at least in part upon the corresponding keywords; and
    code that stores the classification recommendation associated with the at least one item for inclusion in the item feed, the classification recommendation including the at least one category.

2. The non-transitory computer readable medium embodying the program executable by the at least one computing device of claim 1, wherein the item feed application is further configured to send the item feed to the comparison shopping network site over the network.

3. The non-transitory computer readable medium embodying the program executable by the at least one computing device of claim 1, wherein the taxonomy information includes category names and information about at least one item within the plurality of categories.

4. The non-transitory computer readable medium embodying the program executable by the at least one computing device of claim 1, wherein the at least one item is matched to the at least one category using term frequency-inverse document frequency (TFIDF) analysis.

5. The non-transitory computer readable medium embodying the program executable by the at least one computing device of claim 1, wherein the item classification application further comprises code that determines a confidence level associated with the at least one category corresponding to the at least one matching item.

6. A method comprising:
  determining keywords corresponding to individual ones of a plurality of categories of a comparison shopping network site based at least in part upon taxonomy information associated with the plurality of categories, where the taxonomy information associated with the plurality of categories is expanded based at least in part upon related catalog nodes of an electronic commerce network site;
  matching at least one of a subset of a plurality of items offered through the electronic commerce network site to at least one of the plurality of categories based at least in part upon the corresponding keywords; and
  generating in a computing device an item feed of the subset of the plurality of items offered through the electronic commerce network site, the item feed including the at least one matching item and a classification recommendation corresponding to the at least matching one item, the classification recommendation including the at least one matching category.

7. The method of claim 6, further comprising providing the item feed to the comparison shopping network site over a network.

8. The method of claim 6, further comprising determining a confidence level associated with the at least one matching category corresponding to the at least one matching item offered through the electronic commerce network site.

9. The method of claim 8, wherein the classification recommendation includes the confidence level associated with the at least one matching category.

10. The method of claim 6, further comprising:
  matching at least a portion of the plurality of categories with the at least one matching item offered through the electronic commerce network site; and
  determining a confidence level associated with individual ones of the at least a portion of the plurality of categories.

11. The method of claim 10, wherein the classification recommendation includes the plurality of matching categories and the confidence levels associated with the individual ones of the at least a portion of the plurality of categories.

12. The method of claim 10, further comprising determining which categories are included in the classification recommendation based at least in part upon the associated confidence level.

13. The method of claim 6, further comprising determining the related catalog nodes of the electronic commerce network site based at least in part upon one of the plurality of categories of the comparison shopping network site.

14. A system comprising:
   at least one computing device;
   an electronic commerce system implemented in the at least one computing device and configured to offer a plurality of items over a network;
   an item feed application implemented in the at least one computing device and configured to generate an item feed of a subset of the plurality of items for provision to a comparison shopping network site, the item feed including a classification recommendation associated with individual ones of the subset of the plurality of items; and
   an item classification application implemented in the at least one computing device and configured to:
      determine related catalog nodes of an electronic commerce network site based at least in part upon one of a plurality of categories of the comparison shopping network site;
      identify related items included in the related catalog nodes to expand taxonomy information;
      determine keywords corresponding to individual ones of the plurality of categories based at least in part upon the taxonomy information;
      match at least one of the subset of the plurality of items to at least one of the plurality of categories based at least in part upon the corresponding keywords; and
      provide the classification recommendation associated with the at least one matching item for inclusion in the item feed, the classification recommendation including the at least one matching category.

15. The system of claim 14, wherein the item feed application is further configured to provide the item feed to the comparison shopping network site over a network.

16. The system of claim 14, wherein the item classification application is further configured to determine a confidence level associated with the at least one matching category corresponding to the at least one matching item.

17. The system of claim 16, wherein the classification recommendation further includes the confidence level associated with the at least one matching category.

18. The system of claim 16, wherein the classification recommendation comprises a plurality of matching categories and confidence levels associated with individual ones of the plurality of matching categories.

19. The system of claim 14, wherein the item classification application is further configured to obtain the taxonomy information associated with the plurality of categories of the comparison shopping network site.

20. The system of claim 14, wherein the item classification application is further configured to determine a confidence level associated with the at least one category corresponding to the at least one matching item.

* * * * *